US005637197A

United States Patent [19]
Watt et al.

[11] Patent Number: 5,637,197
[45] Date of Patent: Jun. 10, 1997

[54] PROCESS OF COATING A SUBSTRATE WITH RETICULATED BACTERIAL CELLULOSE AGGREGATES

[75] Inventors: Walter D. Watt, Federal Way; Terry N. Adams, Tacoma; Gary D. Peterson; R. Scott Stephens, both of Auburn; James M. Askew, Tacoma, all of Wash.

[73] Assignee: Monsanto Company, St. Louis, Mo.

[21] Appl. No.: 169,925

[22] Filed: Dec. 17, 1993

Related U.S. Application Data

[63] Continuation of Ser. No. 799,578, Nov. 27, 1991, abandoned.

[51] Int. Cl.⁶ .................................................. D21H 19/00
[52] U.S. Cl. ........................ 162/202; 162/141; 162/142; 162/149; 162/204; 427/180; 427/189; 427/194; 427/201; 427/206; 427/421; 427/428
[58] Field of Search ................................. 428/393, 195, 428/206, 196; 162/129, 13, 99, 130, 135, 141, 142, 148, 150, 157.6, 149, 202, 204; 427/180, 189, 194, 201, 206, 44, 428

[56] References Cited

U.S. PATENT DOCUMENTS

| 4,374,702 | 2/1983 | Turbak et al. | 162/100 |
|---|---|---|---|
| 4,861,427 | 8/1989 | Johnson et al. | 162/129 |
| 4,863,565 | 9/1989 | Johnson et al. | 162/150 |
| 4,919,753 | 4/1990 | Johnson et al. | 162/116 |
| 4,988,561 | 1/1991 | Wason . | |
| 5,011,596 | 4/1991 | Shaw | 209/167 |

FOREIGN PATENT DOCUMENTS

| 0 228 779 | 7/1987 | European Pat. Off. . |
| 0 289 993 | 11/1988 | European Pat. Off. . |

OTHER PUBLICATIONS

Encyclopedia of Chemical Technology, vol. 16, John Wiley & Sons, New York, 1981, pp. 785–789.
Encyclopedia of Polymer Science and Engineering, vol. 3, John Wiley & Sons, New York, 1985, pp. 553 & 560–569.
Interstate Supply Company Inc., APV Gaulin "Innovators in Cell Disruption Technology Introduces the 30CD", 3 pages, no date.

*Primary Examiner*—Kathleen Choi
*Attorney, Agent, or Firm*—Albert P. Halluin; Pennie & Edmonds LLP

[57] ABSTRACT

A suspension of bacterial cellulose having a reticulated structure has been conditioned to remain in suspension when the suspension is under shear so that it may be coated on a substrate. The suspension of bacterial cellulose is homogenized and thereafter filtered to provide a bacterial cellulose component having a size no greater than 125 microns. This allows a process for applying bacterial cellulose as a coating on a substrate on a substantially continuous basis, either by roll coating or spraying. It also provides a coated product in which the bacterial cellulose is substantially uniform, taking into account the normal discontinuities of roll coating and spray coating.

10 Claims, No Drawings

PROCESS OF COATING A SUBSTRATE WITH RETICULATED BACTERIAL CELLULOSE AGGREGATES

This application is a continuation of application Ser. No. 07/799,578, filed Nov. 27, 1991 and now abandoned.

BACKGROUND OF THE INVENTION

It has been known for many years that cellulose can be synthesized by certain bacteria, particularly those of the genus Acetobacter. However, taxonomists have been unable to agree upon a consistent classification of the cellulose producing species of Acetobacter. For example, the cellulose producing microorganisms listed in the 15th Edition of the Catalog of the American Type Culture Collection under accession numbers 10245, 10821 and 23769 are classified both as *Acetobacter aceti* subsp. *xylinum* and as *Acetobacter pasteurianus*. For the purposes of the present invention any species or variety of bacterium within the genus Acetobacter that will produce cellulose under agitated conditions should be regarded as a suitable cellulose producer for the purposes of the present invention.

*Acetobactor aceti* subsp. *xylinum* is normally cultured under static conditions with the cellulose microfibrils being produced at the air medium interface. A normal cellulose pellicle produced in a static culture tends to have a lamellar structure with significantly less branching. Most bacteria of this species are very poor cellulose producers when grown in agitated culture. One reason proposed for such poor production is that an agitated culture induces a tendency to mutation to noncellulose producing strains. In contrast, the Acetobacter strains according to the present invention are characterized by an ability to produce large amounts of cellulose in agitated culture without manifesting instability leading to loss of cellulose production in culture.

The present invention involves the processing and use of bacterial cellulose produced by such microorganisms under agitated conditions. U.S. Pat. No. 4,863,565, granted Sep. 5, 1989 discloses Acetobacter varieties which are vigorous cellulose producers under agitated culture conditions. The cellulose produced by the microorganisms and culture conditions disclosed in this application appears to be a unique type, physically quite different from the bacterial cellulose produced in static cultures. It has a highly branched, three dimensional reticulated structure.

Bacterial cellulose fibers formed from an agitated mixture is in the form of pellets or pellet fragments. These pellets may be on the order of 1 mm. in size. The pellets or pellet fragments are then formed in a cake which is typically between 10 and 20% solids. Before use the reticulated bacterial cellulose is diluted to the desired solids content, and soluble or insoluble materials are added to preserve or enhance the properties of the final product.

U.S. Pat. No. 4,861,427 discloses the use of such a bacterial cellulose as a surface treatment for fibrous webs.

U.S. Pat. No. 4,374,702 discloses a process in which a Gaulin homogenizer is used to convert wood pulp fibers to microfibrillated cellulose.

BRIEF SUMMARY OF THE INVENTION

The term "bacterial cellulose" as used in this invention refers to a product essentially free of residual bacteria cells made under agitated culture conditions by a bacterium of the genus Acetobacter. The bacterial cellulose has a reticulated structure formed by a substantially continuous network of branching interconnected cellulose fibers. The strains of bacteria employed may be any having similar characteristics to those grown as a subculture of ATCC Accession No. 53524, deposited under the terms of the Budapest Treaty.

It has been found that bacterial cellulose is difficult to apply continuously as a paper coating because of its size or rheological properties.

There is a problem if it is applied by roll coaters such as a two roll size press, a short dwell coater or other conventional roll coating applicator. It tends to separate from whatever solvent it is in which leads to non-uniform coating of the material to which it is being applied. The coating on the substrate will be streaky or have high and low areas of coating application. A mixture of the bacterial cellulose and a dispersing agent, such as carboxymethyl cellulose (CMC), has been homogenized in a high shear mixer such as a Cowles dissolver. This homogenized suspension has been coated on paper using a roll coater. The bacterial cellulose suspension tends to separate. The solvent rich fraction is transferred preferentially to the paper. The fraction transferred to the paper has less fiber than the fraction that remains in the suspension.

This also results in fiber build-up in the suspension. The increase in solids in the suspension eventually causes the suspension to become too thick to pump or circulate to the rolls. It would require an elaborate process control system to maintain a constant solids content in the suspension by an appropriate addition of other materials such as CMC to maintain a constant percentage of solids in the mixture and prevent the solids build-up.

The inventors believe that there may be one or two reasons for the bacterial cellulose fiber tending to separate. One reason is the high degree of shear created by a moving paper web (~1000 ft/min or greater speed) in a size press nip or at a coater blade. It is believed that this shear induces suspension instability leading to a fiber-deficient layer or zone at the surface of the moving web. The other reason is that the size of the pellets and aggregates of bacterial cellulose is large enough to cause the cellulose to be physically excluded at the nip of a two roll press.

If a spray is used the bacterial cellulose tends to agglomerate and plug whatever orifices it may pass through. The inventors believe that this may be caused by the physical size of the bacterial cellulose pellet or fiber bundle.

A purpose of the present invention is to form a suspension of bacterial cellulose which will allow it to remain in suspension so that it will be coated evenly on a continuous basis on a substrate. Another purpose of the present invention is to provide a suspension of bacterial cellulose which may be coated evenly and continuously by either a roll coater or a spray. It is also a purpose of this invention to provide a suspension of bacterial cellulose in which the particle size of the bacterial cellulose is small enough to remain in suspension under the shear conditions mentioned above and small enough to pass through the nip of a press or through a small orifice. The inventors believe these purposes may be accomplished if the size of the bacterial cellulose pellet or aggregate is no greater than 125 microns. This can be at least one-eighth of the size of an unbroken bacterial cellulose pellet.

A bacterial cellulose suspension prepared according to the invention overcomes the problem of separation. As stated above, suspensions of bacterial cellulose tend to separate into two elements, a solvent rich fraction and a bacterial cellulose rich fraction. Bacterial cellulose prepared according to the invention remains in suspension even under the shear of the nip of twin applicator rolls.

The bacterial cellulose suspension is formed by first homogenizing a diluted bacterial cellulose material and then filtering the homogenized mixture to produce a bacterial cellulose suspension that remains in suspension under shear.

A bacterial cellulose suspension prepared according to the invention has been recirculated through spray heads having 20 mil orifices for many hours without agglomerating or plugging the spray head orifices with large aggregates of the bacterial cellulose. This allows the bacterial cellulose to be sprayed as a coating on paper surfaces or other surfaces.

The invention provides a process for applying bacterial cellulose as a coating on a substrate on a substantially continuous basis, either by roll coating or spraying. It also provides a coated product in which the bacterial cellulose is substantially uniform, taking into account the normal discontinuities of roll coating and spray coating.

DETAILED DESCRIPTION

The production of reticulated bacterial cellulose is disclosed in Example 1 of U.S. Pat. No. 4,861,427.

The problems of using this material to coat substrates or to use under conditions of shear are noted above. It is believed by the inventors that the shear separation of the suspension is affected by the degree of uniform dispersion of the reticulated bacterial cellulose suspensions. Shear separation is more severe when large pellets and aggregates of the bacterial cellulose are present.

Homogenization Stage

The dilute unhomogenized suspension consists of pellets and fiber bundles with a wide range of structural integrity.

A series of homogenization steps provide the best overall dispersion of the various pellets and fiber bundles. The individual homogenization steps are directed at pellets and fiber bundles of different structural integrity. Because of this the order in which the various steps may be applied can be varied from the order discussed below.

As well, new processes which accomplish homogenization of a particular range of pellet or fiber bundle integrity may be substituted for the step currently used without changing the overall intention of homogenization in stages.

By using a high shear type mixer/homogenizer similar to a Cowles or a blade type, and allowing time to suit the batch quantity, partial homogenization is obtained.

However, to obtain full homogenization, the material must be subjected to a more severe treatment. One such treatment is passing the material through a restricted passageway at high pressures, 5,000–15,000 psig, and subsequently impinging the material at the resultant velocity against a solid surface. The restricted passageway may be of an earlier type shown in FIG. 1 of U.S. Pat. No. 4,374,702 or it may be a more recent type similar to that used in present day biotechnology for cell disruption which includes a "CD valve". APV Gaulin, Inc., for one, manufactures such devices. The number of passes through this type of device will depend on the degree of homogenization required for the end use. A blender/mixer may be used as a final step of homogenization.

Alternatively, the number of homogenization steps may be reduced by incorporating filtration steps which effectively remove a portion of the larger material.

A number of types of equipment were tested for the ability to provide adequate homogenization. The Gaulin Homogenizer, especially with the CD Valve, was considered the most efficient. The Microfluidics was considered to be similar in performance. The Jordan Refiner, Hydrapulper and centrifugal pumps are not adequate. Other equipment, such as the Cowles Dissolver, Arde Barinco, Ross, Kimematica and Bematek might homogenize but there is a greater amount of reject material that requires reprocessing.

Filtration Stage

After homogenization, filtration can begin with a typical 150 micron (opening) wire cloth basket or other similar sized filter. The material may then be passed through finer filters until a final filtering utilizing a 125 micron or smaller opening wire cloth. 100 micron opening screens have been used. Again successive passes may be dependent on the final use.

General

It should be noted that the homogenization and filtering stages may not follow the above sequence but blend some of the steps. For example, the bacterial cellulose suspension may be mixed with a high shear homogenizer, then filtered with a 150 micron opening or smaller opening filter, and then, pass only the rejected material through the high pressure homogenization step and follow this step by additional filtering with 150 micron opening and 125 micron or smaller opening filters.

In any of the treatments, the rejected bacterial cellulose material may be reprocessed by homogenization and refiltering.

EXAMPLES

In each of the examples the bacterial cellulose is mixed with a suspending and dispersing agent. An exemplary suspending and dispersing agent, used in these examples, is carboxymethyl cellulose (CMC). The use of a dispersing agent appears to give a considerably more uniform, low porosity coating on the raw stock surface. The ratio of bacterial cellulose to dispersing agent may be from 2:1 to 10:1. The ratio used throughout the examples is 4:1.

Other suspending agents besides CMC are expected to be equally useful. These would include both natural and synthetic material such as water soluble cellulose ethers. Experiments made using Alco gum showed it to be equivalent to CMC. Alco gum is supplied in the form of a reactive acidic emulsion based on a copolymer of methacrylic acid and ethyl acrylate and is available from Alco Chemical Co., Chattanooga, Tenn.

In some instances it may be advisable to use a preservative for the bacterial cellulose. Sorbic acid is exemplary of the preservatives that may be used. Its use will depend on the time the bacterial cellulose will be held before use. The amount of preservative may be from 0.05 to 0.15% of the total weight of the suspension. In the present examples 0.1% of the total weight of the suspension was used.

The following examples illustrate the conditioning of the bacterial cellulose suspension by homogenization and filtration, different methods of accomplishing this treatment, and the product produced by the conditioning treatment. They also illustrate coating a substrate with the conditioned bacterial cellulose suspension by spray coating and roll coating methods, and the coated products produced from the conditioned bacterial cellulose suspension.

EXAMPLE 1.

The following process was followed to condition bacterial cellulose.

A cake of bacterial cellulose is diluted to a desired solids level. This can be from 0.2 to 1.5% of the total weight of the suspension. A preferred range is 0.4 to 1.3% of total weight of the suspension. CMC is added to obtain a bacterial cellulose/CMC ratio of 4:1. Sorbic acid is added as a preservative. This may be 0.1% of the total weight of the suspension.

The diluted bacterial cellulose suspension is mixed for 10-15 minutes using a Lightning mixer to prehomogenize the suspension.

The prehomogenized material is homogenized by being run at 8000 psig for either 5 passes through a standard 2 head Gaulin Homogenizer or 2 passes through a Gaulin Homogenizer which has been fitted with a "CD" valve. The Gaulin Homogenizer is available from APV Gaulin, Inc. of Hilversum, Holland.

The homogenized material is first filtered through a 150 micron opening wire screen basket strainer. It is then filtered through a 125 micron opening wire screen basket strainer.

EXAMPLE 2.

The coating formulation was a 0.8% bacterial cellulose/ 0.2% CMC mixture with 0.1% sorbic acid in water. This material was homogenized in the Gaulin Homogenizer for three passes through the CD valve, followed by one pass through a 150 micron opening filter and one pass through a 125 micron opening filter. The material was sprayed onto a paper substrate.

EXAMPLE 3

A 4:1 ratio formulation of bacterial cellulose and CMC in water was prepared using 1% bacterial cellulose, 0.25 % CMC and 0.1% sorbic acid based on the total weight of the suspension. The ingredients were stirred together and passed 5 times through a Gaulin Homogenizer at 8000 psig. There was no CD valve on the Homogenizer. The material was then passed through a 150 micron filter and 125 micron filter. The final total solids was 1.33% and the final Brookfield viscosity was 1040 centipoise at 100 RPM.

EXAMPLE 4

A 4:1 ratio formulation of bacterial cellulose and CMC in water was prepared using 1% bacterial cellulose, 0.25% CMC and 0.1% sorbic acid. The sorbic acid was dissolved in hot water with agitation. The CMC was dissolved in the sorbic acid solution. The bacterial cellulose was added and the suspension was agitated for 20 minutes. This slurry was passed twice through the Gaulin Homogenizer. The Homogenizer had a CD valve. The mixture was filtered through a 150 micron opening filter and then through a 125 micron opening filter. The final total solids was 1.24% and the final Brookfield viscosity was 1220 centipoise at 100 RPM.

EXAMPLE 5

A 4:1 ratio formulation of bacterial cellulose and CMC was prepared using 0.8% bacterial cellulose, 0.2% CMC and 0.1% sorbic acid based on the total weight of the suspension. The suspension was prepared by dissolving CMC in cold water in a Hydrapulper. The bacterial cellulose was added and the mixture hydrapulped for 90 minutes. The sorbic acid was added at 85 minutes. The suspension was passed once through a Gaulin Homogenizer and then filtered through a 150 micron opening filter, a 125 micron opening filter and finally through a 100 micron opening filter. The final total solids was 1.02% and the final Brookfield viscosity was 1074 centipoise at 100 RPM.

EXAMPLE 6

A test to determine the amount of dewatering was devised.

The test is called centrifuge dewatering. In the centrifuge dewatering test, "g" forces are applied in an attempt to create a clear water layer in the bacterial cellulose suspension. The height of the water layer is taken as a measure of the tendency to dewater. This represents the suspension shear stability.

In the following Table I, a centrifuge tube containing a conditioned suspension of bacterial cellulose to a height of 72 mm was centrifuged 60 minutes at 2500 revolutions per minute to obtain the centrifuge dewatering test result. The material had been conditioned using different equipment for varying times.

TABLE I

| Ex. | Conditioning Equipment | Conditioning Time * | Centrifuge Dewatering Test Result mm † |
|---|---|---|---|
| 6-1 | Lightning Mixer | 100 minutes | 42 |
| 6-2 | Kinematic Homogenizer | 2 passes | 5–10 |
| 6-3 | 100 liter Cowles Dissolver | 60 minutes | 3 |
| 6-4 | Kinematic Homogenizer | 12 passes | 0 |
| 6-5 | Hydrapulper + Gaulin Homogenizer with CD valve | 90 minutes 1 pass # | 0 |
| 6-6 | Lighting Mixer + Gaulin Homogenizer with CD valve | 60 minutes 3 passes ‡ | 0 |

* Approximately 1% total solids of bacterial cellulose and CMC
† Height of the supernatant layer of water after centrifuging
90 minute mixing in the Hydrapulper and 1 pass through the Gaulin Homogenizer
‡ 60 minute mixing in a Lightning mixer and 3 passes through a Gaulin Homogenizer

EXAMPLE 7

Suspensions of bacterial cellulose and CMC were homogenized using different types of equipment and different process parameters. The viscosity of the suspension after homogenization was determined. After homogenization the suspension was filtered in a 150 micron screen and the number of gallons of material that would pass through the filter before it would blind or stop passing material was determined. The centrifuge dewatering level (dewatering stability) was also determined using the test of Example 6. The results are shown in Table II.

TABLE II

| Ex. | Equipment | Viscosity cp | Volume to Filter Blinding gal. | Dewater Stability mm |
|---|---|---|---|---|
| 7-1 | Gaulin Homogenizer 5 passes | 900 | 200 est. | 0 |
| 7-2 | Gaulin Homogenizer 3 passes | 800 | * | 0 |

TABLE II-continued

| Ex. | Equipment | Viscosity cp | Volume to Filter Blinding gal. | Dewater Stability mm |
| --- | --- | --- | --- | --- |
| 7-3 | Hydrapulper + Gaulin Homogenizer 1 pass | 1200 | 100 | 0 |
| 7-4 | 50 Gal. Cowles 60 min. | 1000 | 0 | 3 |
| 7-5 | Kinematica 40 passes | 1100 | 1 | 0 |

\* The entire sample of 150 gallons passed through the filter without blinding.

The samples which were conditioned by homogenizing and filtering showed no separation and remained in suspension.

EXAMPLE 8

A 4:1 bacterial cellulose /CMC/ sorbic acid suspension having a 1.13% total solids content was prepared by passing the suspension three times through a Gaulin homogenizer followed by filtration through a 125 micron opening filter. Different coating levels of the suspension were applied to paper having a basis weight of 60 pounds per ream using different applicator methods. An uncoated control and a starch control were also used. The applicators, materials and amounts applied are given in Table III.

TABLE III

| Ex | Applicator | Material | Amount #/Ton |
| --- | --- | --- | --- |
| 8-1 | None | None | None |
| 8-2 | 2 roll size press | Starch | 97 #/T |
| 8-3 | Roll applicator – flooded nip + bent blade | bacterial cellulose CMC | 6.7 #/T |
| 8-4 | Roll applicator – flooded nip + bent blade | bacterial cellulose CMC | 3.3 #/T |

The conditioned material remained in suspension during the application and did not separate.

The papers were soft nip calendered at 492 feet per minute, 6000 pounds per square inch and 400° F. and various properties were measured.

The K&N test is the % Brightness Drop. The K&N Brightness Drop is measured by first measuring the sample for brightness before the K&N ink is applied to the sample. The K&N standard test ink is applied to the surface and allowed to set for two minutes. After two minutes, the K&N ink is wiped off using a soft cloth or paper towel. The sample is then measured on the Technidyne Model S-4 Brightness Tester at the area where the K&N ink was applied to the surface. This value is divided by the initial brightness value to obtain a percent brightness. This value is a measurement of the oil absorbtion characteristic of the paper. The ink used for all samples was standard K&N testing ink. The Technidyne Model S-4 Brightness Tester was supplied by Technidyne Corporation of New Albany, Ind.

The calendering developed the gloss of the sample. Gloss of paper is the light reflectance from the paper's surface. A beam of light is projected onto the paper surface at an angle of 75° on a Hunterlab Modular Glossmeter Model D48D according to TAPPI Standard Method T480 and ASTM 1223–63T. The gloss values are in percentage reflectance at a 75° angle.

Ink density is a measure of relative blackening of the printed image and is related to ink holdout on the surface of the paper. Ink density is measured to determine if the printed image has a consistent density through the run, or to determine if there is adequate ink coverage. Ink density was measured on a modified Prufbau-minidens densitometer. A scan of 11 cm per sample gives 280 individual readings with an end mean and standard deviation. The ink used was a standard heatset offset type oil base ink. The results are shown in Table IV.

TABLE IV

| Ex. | K&N % | Sheet Gloss | Ink Gloss | Ink Density |
| --- | --- | --- | --- | --- |
| 8-1 | 40.2 | 43 | 45.5 | 1.32 |
| 8-2 | 35.2 | 38.1 | 45.2 | 1.36 |
| 8-3 | 5.2 | 56.8 | 71.7 | 1.76 |
| 8-4 | 11.4 | 57.3 | 64 | 1.44 |

Examples 8-1 and 8-2 are the control samples, and examples 8-3 and 8-4 are the bacterial cellulose samples. In each of the tests the paper coated with bacterial cellulose showed excellent results and compared with results expected from a fully coated sheet.

Other properties measured were porosity and smoothness.

Gurley Porosity is a well known test and measures the time in seconds under standard conditions for 100 ml. of air to pass through the sheet.

Sheffied Smoothness is a measure of surface smoothness. It is TAPPI Method T-538 om-88. The method measures air flow between the specimen (backed by a flat glass plate on the back side) and two pressing, concentric annular lands that are impressed into the speciman from the top side. The rate of air flow is related to the surface smoothness of the paper.

Parker Print-Surf is another measure of surface roughness. It is an air leak-type of test measured under conditions similar to those experienced on a printing press. This is now a standard I.S.O. Method for measurement of surface roughness of paper and board. Apparatus for carrying out the test is available from H. E. Messmer Ltd., London, England. The results of these tests are given in Table V.

TABLE V

| Ex. | Gurley Porosity sec/100 mils | Sheffield Smoothness | Parker Print Surf, S/20 |
| --- | --- | --- | --- |
| 8-1 | 33 | 75.2 | 1.79 |
| 8-2 | 34 | 84.4 | 2.11 |
| 8-3 | 399 | 33.8 | 1.12 |
| 8-4 | 150 | 42.8 | 1.33 |

Again, examples 8-1 and 8-2 are the controls, and examples 8-3 and 8-4 are the bacterial cellulose coated paper. The Gurley Porosity figures show the bacterial cellulose created a tight film surface. The Sheffield Smoothness test figures and the Parker Print-Surf figures indicate a very smooth surface when bacterial cellulose is applied.

EXAMPLE 9

The suspension of Example 8 was applied at a different coating level to paper having a basis weight of 60 pounds per ream and compared to a starch control. The applicators, materials and amounts applied are given in Table VI.

TABLE VI

| Ex. | Applicator | Material | Amount #/Ton |
|---|---|---|---|
| 9-1 | 2 roll size press | Starch | 97 #/T |
| 9-2 | Short dwell coater, bent blade | bacterial cellulose CMC | 4.5 #/T |
| 9-3 | 2 roll size press | Starch | 97 #/T |
| 9-4 | short dwell coater, bent blade | bacterial cellulose CMC | 4.5 #/T |

Again, the conditioned bacterial cellulose suspension did not separate when being applied by the coaters.

The papers were soft nip calendered at 438 feet per minute, 6000 pounds per square inch. Examples 9-1 and 9-2 were calendered at 300° F., and examples 9-3 and 9-4 were calendered at 400° F. Various properties were measured. The results are shown in Tables VII and VIII.

TABLE VII

| Ex. | K&N % | Sheet Gloss | Ink Gloss | Ink Density |
|---|---|---|---|---|
| 9-1 | 45.8 | 19.5 | 28.4 | 1.30 |
| 9-2 | 17 | 45.4 | 57.1 | 1.59 |
| 9-3 | 39.8 | 24.6 | 35.5 | 1.34 |
| 9-4 | 16.3 | 42.9 | 57.4 | 1.58 |

Examples 9-1 and 9-3 are the controls, and examples 9-2 and 9-4 are the bacterial cellulose coated samples. The K&N Brightness Drop, the Sheet Gloss, the Ink Gloss and the Ink Density figures for the paper coated with bacterial cellulose are excellent.

TABLE VIII

| Ex. | Gurley Porosity | Sheffield Smoothness | Parker Print Surf, S/20 |
|---|---|---|---|
| 9-1 | 25.3 | 99.1 | 2.67 |
| 9-2 | 83.9 | 69.4 | 1.76 |
| 9-3 | 29.3 | 87.7 | 2.29 |

TABLE VIII-continued

| Ex. | Gurley Porosity | Sheffield Smoothness | Parker Print Surf, S/20 |
|---|---|---|---|
| 9-4 | 50.9 | 60.7 | 1.44 |

Again, the Gurley Porosity, Sheffield Smoothness and Parker Print-Surf figures for the bacterial cellulose examples 9-2 and 9-4 are excellent when compared with their respective control samples 9-1 and 9-3.

We claim:

1. A process of coating a substrate with reticulated bacterial cellulose on a substantially continuous basis, said process comprising the steps of:
   (i) providing a bacterial cellulose suspension comprising reticulated bacterial cellulose aggregates having a size no greater than 125 microns; and
   (ii) coating a substrate with said suspension on a substantially continuous basis.

2. The process of claim 1 in which said coating is accomplished by roll coating.

3. The process of claim 1 in which said coating is accomplished by spraying.

4. The process of claims 1, 2 or 3 in which said substrate is paper.

5. The process of claim 1 in which said aggregates of bacterial cellulose have a size less than 100 microns.

6. The process of claims 1, 2, 3 or 5 in which said bacterial cellulose is present in said suspension in an amount of 0.4 to 1.2% based on the weight of the total suspension.

7. The process of claims 1, 2, 3 or 5 in which the suspension further comprises a dispersing agent.

8. The process of claim 7 in which said dispersing agent is selected from the group consisting of carboxymethyl cellulose, water soluble cellulose ethers and Alco gum.

9. The process of claim 7 in which said dispersing agent is present in an amount of from 0.1 to 0.3% based on the total weight of the suspension.

10. The process of claim 9 in which said dispersing agent is selected from the group consisting of carboxymethyl cellulose, water soluble cellulose ethers and Alco gum.

* * * * *